(12) United States Patent
Kaneko

(10) Patent No.: US 8,994,989 B2
(45) Date of Patent: Mar. 31, 2015

(54) MANAGEMENT SYSTEM AND METHOD THEREFOR

(75) Inventor: Tsuyoshi Kaneko, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 373 days.

(21) Appl. No.: 13/157,226

(22) Filed: Jun. 9, 2011

(65) Prior Publication Data

US 2011/0304884 A1 Dec. 15, 2011

(30) Foreign Application Priority Data

Jun. 11, 2010 (JP) ................................ 2010-134309

(51) Int. Cl.
| | | |
|---|---|---|
| G06K 15/00 | (2006.01) | |
| G06F 3/12 | (2006.01) | |
| G03G 15/00 | (2006.01) | |
| G06F 11/07 | (2006.01) | |
| H04N 1/00 | (2006.01) | |
| H04N 1/32 | (2006.01) | |

(52) U.S. Cl.
CPC .......... *G06F 3/1287* (2013.01); *G03G 15/5079* (2013.01); *G06F 3/121* (2013.01); *G06F 3/1234* (2013.01); *G06F 11/0733* (2013.01); *G06F 11/0748* (2013.01); *G06F 11/0775* (2013.01); *H04N 1/00344* (2013.01); *H04N 1/32625* (2013.01); *H04N 1/32662* (2013.01); *G03G 15/55* (2013.01); *G06F 3/1204* (2013.01); *G06F 3/1273* (2013.01); *H04N 1/00244* (2013.01); *H04N 2201/001* (2013.01); *H04N 2201/0039* (2013.01); *H04N 2201/0049* (2013.01); *H04N 2201/0094* (2013.01)
USPC ............... 358/1.15; 399/24; 399/26; 399/31

(58) Field of Classification Search
USPC .......................................................... 358/1.15
See application file for complete search history.

(56) References Cited

U.S. PATENT DOCUMENTS

| 2009/0213418 A1* | 8/2009 | Kaneko | 358/1.15 |
| 2010/0053674 A1* | 3/2010 | Kano | 358/1.15 |

FOREIGN PATENT DOCUMENTS

| JP | 07-230372 A | 8/1995 |
| JP | 2008-210103 A | 9/2008 |
| JP | 2009-206788 A | 9/2009 |

* cited by examiner

*Primary Examiner* — Steven Kau
*Assistant Examiner* — Andrew H Lam
(74) *Attorney, Agent, or Firm* — Canon U.S.A. Inc., IP Division

(57) ABSTRACT

A management server capable of communicating with a providing apparatus via a network and using a function provided by the providing apparatus includes a reception unit configured to receive failure information from the image forming apparatus, and a notification unit configured to perform notification for arranging maintenance of the image forming apparatus according to the failure information received from the image forming apparatus, wherein the management server does not arrange the maintenance of the image forming apparatus if it can be identified that the failure is caused by the providing apparatus based on the received failure information.

7 Claims, 9 Drawing Sheets

FIG.4

| SERVICE / MODEL | FILE MANAGEMENT | NETWORK PRINT | Workflow | ... |
|---|---|---|---|---|
| iR 10x | × | × | × | ... |
| iR xxx | ○ | ○ | × | ... |
| iR-Adv Cxxx | ○ | ○ | ○ | ... |
| ⋮ | ⋮ | ⋮ | ⋮ | ... |

| FIRMWARE \ SERVICE | FILE MANAGEMENT | NETWORK PRINT | Workflow | ... |
|---|---|---|---|---|
| Main | 1.80 | 1.80 | 2.10 | ... |
| print | — | 1.00 | — | ... |
| Pdl_boald | 1.04 | 1.04 | — | ... |
| ⋮ | ⋮ | ⋮ | ⋮ | ... |

FIG.6

| FAILURE CODE 601 | FAILURE CONTENTS 602 |
|---|---|
| 720003 | RENDERING ERROR |
| x20003 | RENDERING ERROR (PDL CANNOT BE INTERPRETED) |
| xxxxxx | CODE INDICATING MALFUNCTION OF PROVIDING APPARATUS |
| ⋮ | ⋮ |

FIG.7

| SALES COMPANY ID | CUSTOMER ID | IMAGE FORMING APPARATUS ID | NAME OF MAINTENANCE STAFF | ADDRESS |
|---|---|---|---|---|
| AAA01 | CUST0001 | DEV000001 | TAROU KOSUGI | xxx.taro@caon.co.jp |
| AAA01 | CUST0001 | DEV000002 | TAROU KOSUGI | xxx.taro@caon.co.jp |
| AAA02 | CUST0002 | DEV000011 | HANAKO KOSUGI | xxx.hanako@caon.co.jp |
| ... | ... | ... | ... | ... |
| — | CUST0001 | DEV000001 | JIROU MARUKO | ziro@cloudservice.co.jp |

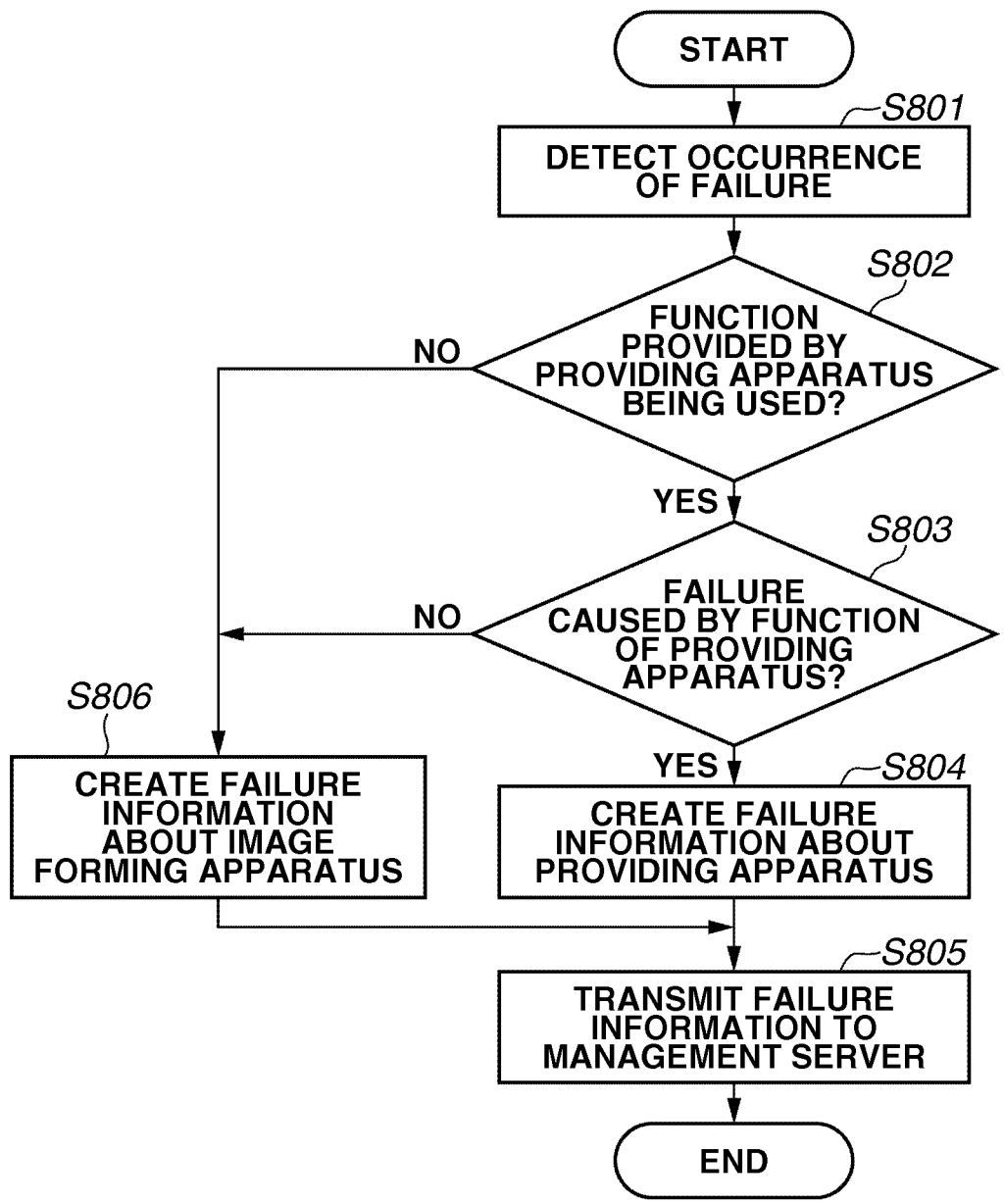

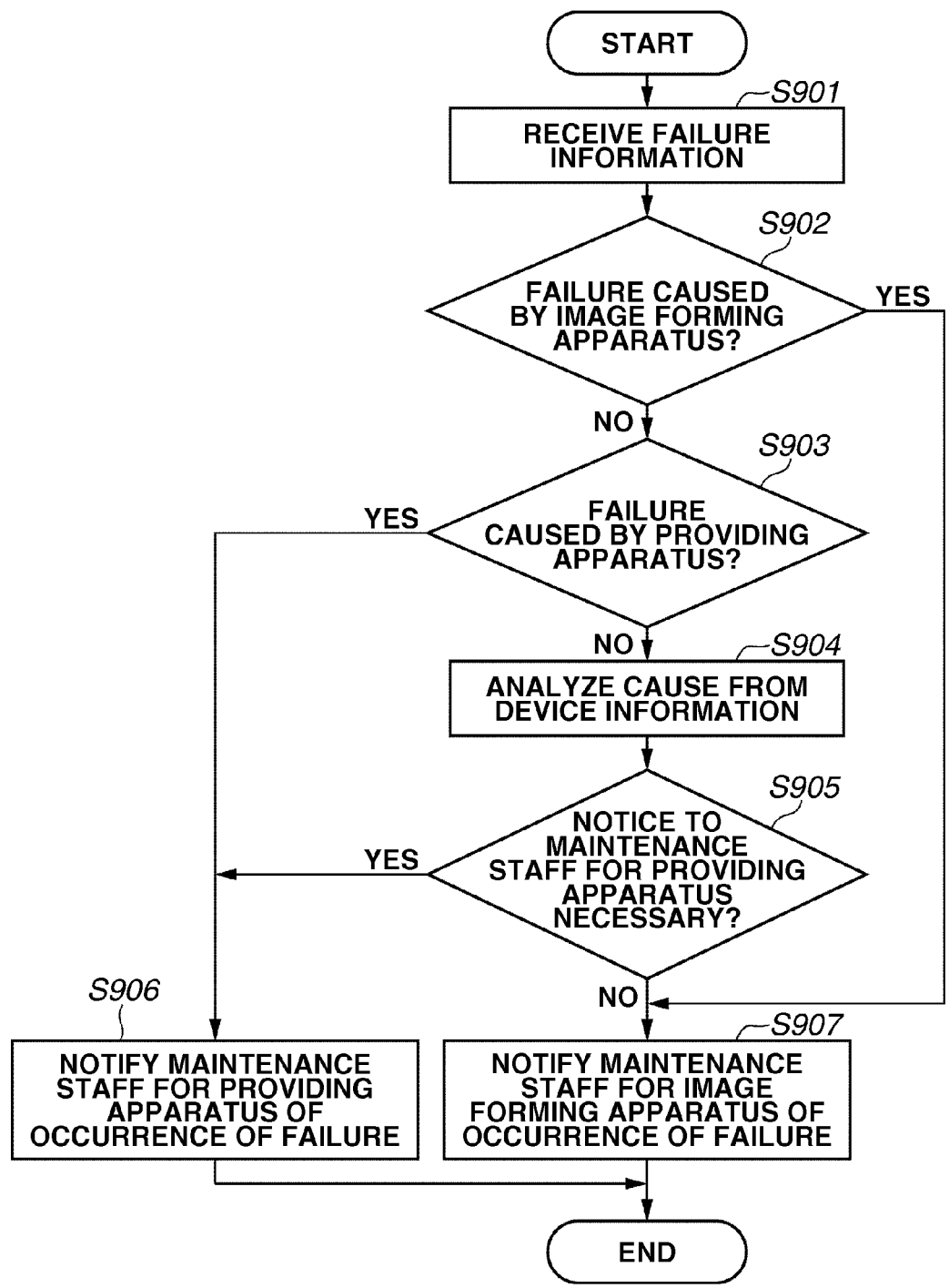

MANAGEMENT SYSTEM AND METHOD THEREFOR

BACKGROUND OF THE INVENTION

1. Field of the Invention

The present invention relates to a technique for remotely controlling an image forming apparatus in an environment in which a function provided by the image forming apparatus can be used via a network.

2. Description of the Related Art

An image forming apparatus such as a copying machine and a printer used in an office is provided with various functions. The functions provided for the image forming apparatus, for example, include a scan function, a facsimile function, and a transmission function of specifying an address and transmitting data. In addition to the above, there is a function of converting scanned data to a portable document format (PDF) or to a desired page description language (PDL) format in printing.

Conventionally, a system has been known which detects a failure occurring when the function provided for such an image forming apparatus is used and notifies a management server on a network of the failure. The management server performs processing, such as storage processing, analysis processing, and notification processing to a user, with respect to the notified information. Another system has been discussed in which a management server issues an instruction to an image forming apparatus based on device information including management information and operation information of the image forming apparatus (refer to Japanese Patent Application Laid-Open No. 2008-210103, for example). The management information may include information about a network and a model of the image forming apparatus. The operation information may include information about failure and a counter in the image forming apparatus.

It is assumed that at least a part of the above-described functions provided for the image forming apparatus is arranged on the server on the Internet. The image forming apparatus accesses the server via a communication line to use the function arranged on the server, so that the image forming apparatus can use the functions which are not provided for the own apparatus. If the function of converting scanned data to the PDF format is arranged on the network, for example, the following processing can be presumed. Scanning is performed by the image forming apparatus in an office and data are transmitted to the server on the network via the communication line. Then, the server on the network converts the transmitted data to the PDF format and transmits the converted data to the image forming apparatus in the office. Accordingly, the image forming apparatus can acquire the scanned data in the PDF format. The introduction of such a system enables a user to freely use a desired function if the image forming apparatus has a function of communicating with the network and can improve the convenience. Further such system can eliminate the need for an operation that an image forming apparatus provided with a specific function is installed in the office and shared by a plurality of users. Furthermore, the system can solve an issue that the resource (a hard disk (HDD), a memory, and others) in the image forming apparatus runs short.

However, a conventional management system discussed in Japanese Patent Application Laid-Open No. 2008-210103 can deal with failure occurred in the image forming apparatus but cannot recognize a defect or failure occurred in an external device such as a server that provides a function for the image forming apparatus. For example, if the user finds any defect while using the function provided on the network by the image forming apparatus, the user may think the defect is caused in the image forming apparatus. It is presumed that, if a defect occurs when the image forming apparatus tries to use the function provided on the network, the image forming apparatus itself notifies the management server of the defect. The management server cannot determine whether the defect is caused in the image forming apparatus or in an external device, but may handle the defect as that caused in the image forming apparatus in the worst-case scenario.

Here, the management server performs notification for dispatching a serviceperson for restoring a failure if the image forming apparatus managed thereby causes the failure. In the above-described case, the management server dispatches the serviceperson to a location where the image forming apparatus, which does not cause a failure, is installed. Such operation may cause a wasteful dispatching cost. In case that an external device on the network has any problem, if the management server could notify a maintenance engineer for the external device of the problem at the point when the management server recognizes the problem, a quick recovery can be realized.

Consequently, a flexible mechanism is demanded which can identify where a failure occurs and dispatch a serviceperson appropriate for the failure corresponding to an environment surrounding the image forming apparatus.

SUMMARY OF THE INVENTION

According to an aspect of the present invention, a management system includes an image forming apparatus and a management server configured to communicate with the image forming apparatus via a network. The image forming apparatus is capable of communicating with a providing apparatus via a network and is further capable of using a function provided by the providing apparatus, and includes a determination unit configured to determine whether a failure detected by the image forming apparatus is caused by the providing apparatus at the time of creating failure information to be transmitted to the management server, a creation unit configured to create failure information by which it can be identified that the failure is caused by the providing apparatus if the determination unit determines that the failure is caused by the providing apparatus and create failure information about the failure detected by the image forming apparatus if the determination unit does not determine that the failure is caused by the providing apparatus, and a transmission unit configured to transmit the failure information created by the creation unit to the management server. The management server includes a reception unit configured to receive failure information from the image forming apparatus, and a notification unit configured to perform notification for arranging maintenance of the image forming apparatus according to the failure information received from the image forming apparatus, wherein the management server does not arrange the maintenance of the image forming apparatus if it can be identified that the failure is caused by the providing apparatus based on the received failure information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a correspondence table between information about the model of the image forming apparatus managed by the management server and the functions provided by a providing apparatus.

FIG. 6 is an example of a failure information table managed by the management server.

FIG. 7 is an example of a table related to notification destination information managed by the management server.

FIG. 8 is a flowchart illustrating a process in which the image forming apparatus transmits failure information to the management server.

FIG. 9 is a flowchart illustrating a process in which the management server performs notification according to the cause of failure.

DESCRIPTION OF THE EMBODIMENTS

Various exemplary embodiments, features, and aspects of the invention will be described in detail below with reference to the drawings.

Figure 1:
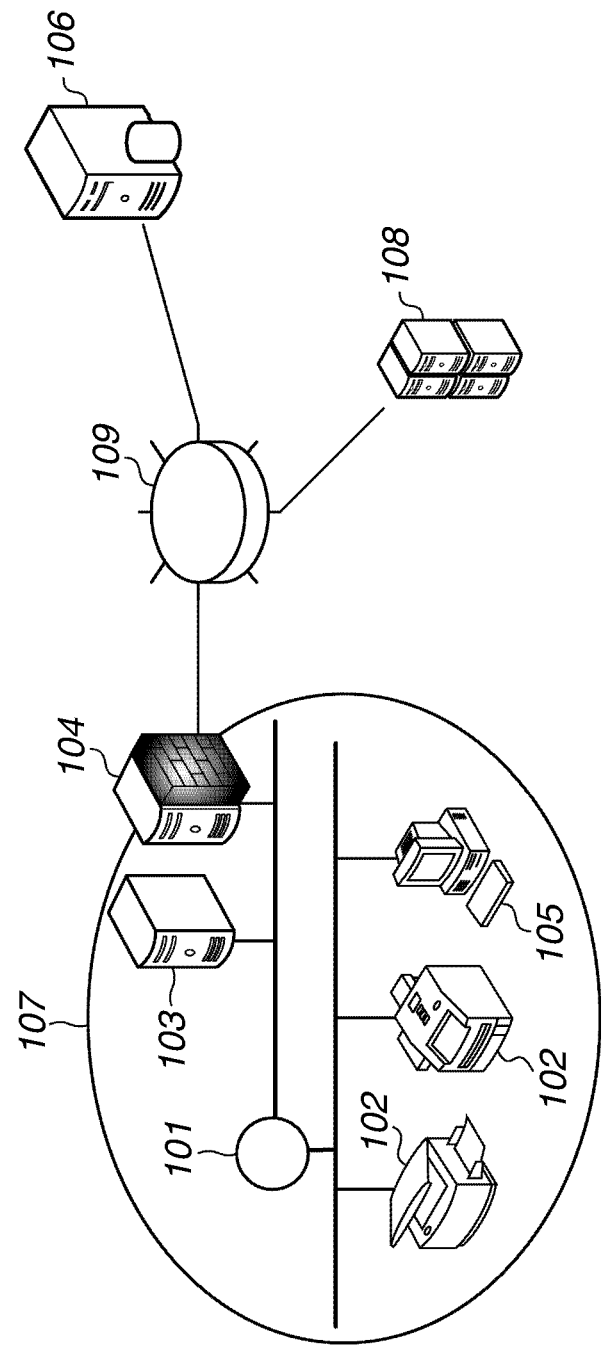
FIG. 1 illustrates an example of a general configuration of an exemplary embodiment of the present invention.

FIG. 1 is an example of a configuration of a management system according to a first exemplary embodiment of the present invention and illustrates a relationship between an image forming apparatus and a management server which are connected via the Internet.

In the management system, there are a local area network (LAN) 101, an image forming apparatus 102, a proxy server 103, and a firewall (FW) 104 arranged to increase security. The image forming apparatus 102 may include the functions of facsimile and copying (not illustrated). A personal computer (PC) 105 is used for business by a general user. A management server 106 performs processing for managing and maintaining device information of the image forming apparatus 102. A local environment 107 protected by the FW is one of customer environments, for example, managed by the management server 106.

A plurality of the image forming apparatuses 102 is presumably installed in the customer environment as illustrated in FIG. 1. When a failure occurs in the image forming apparatus 102, the management server 106 is notified of the failure and arranges a serviceperson. The image forming apparatus 102 transmits device information such as management information and operation information thereof to the management server 106 via the Internet 109 when a failure occurs and according to a communication schedule. Although not illustrated, the management server 106 can be connected to a plurality of these customer environments to remotely manage the image forming apparatus 102 in the environments.

A providing apparatus 108 provides various functions for the image forming apparatus 102 and is equipped with the functions which can be used by the image forming apparatus 102 via the Internet 109. The providing apparatus 108 includes such functions available by the image forming apparatus 102 cooperating with the providing apparatus 108 as a function of a large amount of storage, a form generation application, a data format conversion application, and a work flow generation application, for example. When the image forming apparatus 102 uses the function equipped in the providing apparatus 108, the image forming apparatus 102 communicates with the providing apparatus 108 via the Internet 109 and causes the providing apparatus 108 to perform a predetermined processing. Then, the image forming apparatus 102 receives the processing result from the providing apparatus 108 and provides the user with the function.

In the present exemplary embodiment, it is assumed that a hypertext transfer protocol (HTTP) or a hypertext transfer protocol security (HTTPS) is used as a communication protocol, but it is not limited to those. In the example illustrated in FIG. 1, for example, the image forming apparatus 102 transmits data to the management server 106 via the proxy server 103 and the FW 104 using the HTTPS.

Figure 2:
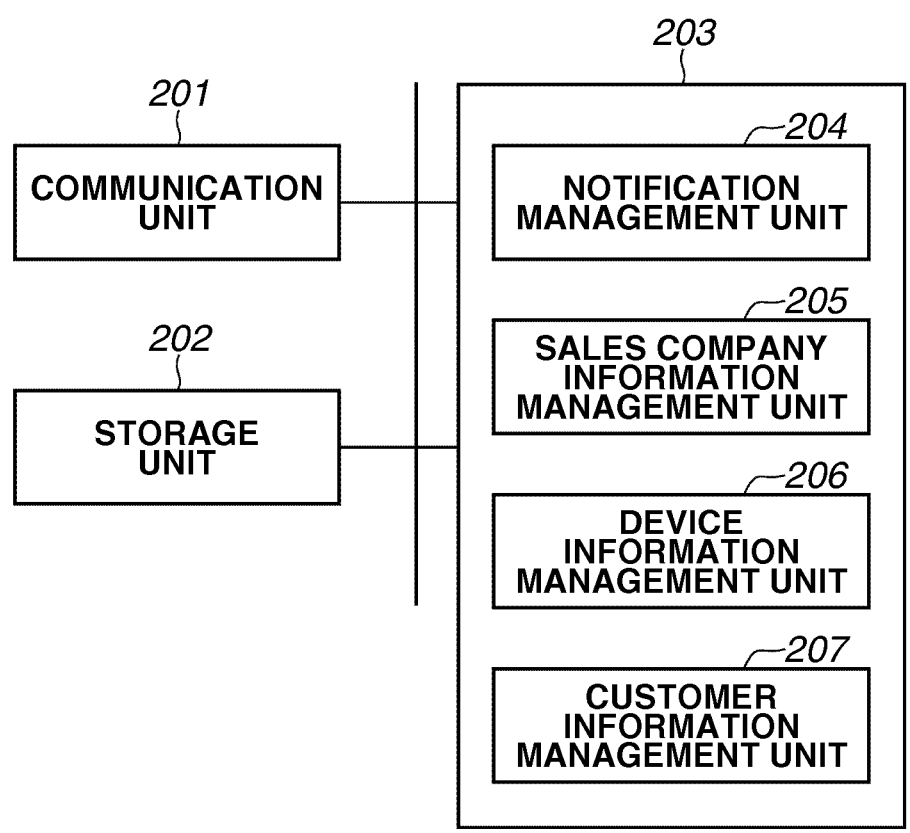
FIG. 2 illustrates an example of a configuration inside a management server according to the exemplary embodiment of the present invention.

FIG. 2 illustrates an example of an internal configuration of the management server 106. The management server 106 includes a communication unit 201, a storage unit 202 including a hard disk drive (HDD), a read-only memory (ROM), and a random access memory (RAM), and a control unit 203 such as a central processing unit (CPU).

The communication unit 201 has a function of communicating with the image forming apparatus 102. The communication unit 201 receives device information (e.g., a counter value, operation information such as log, and information about hardware failure or frequent occurrence of paper jam) from the image forming apparatus 102 and transmits a required instruction and setting information to the image forming apparatus 102. The counter value indicates the number of prints performed in the image forming apparatus 102 and the frequency of use of a component. Information pieces about a device, a sales company, a customer, and the like are stored in the storage unit 202.

The control unit 203 executes the program stored in the storage unit 202 to realize processing performed by each logic module such as a notification management unit 204, a sales company information management unit 205, a device information management unit 206, and a customer information management unit 207. The control unit 203 realizes the monitoring of the image forming apparatus 102 and the management of the information required for maintenance described below.

The notification management unit 204 generates notification information required for the monitoring of the image forming apparatus 102 and specifies a notification destination to perform communication control via the communication unit 201. The notification includes a maintenance request notification for arranging a serviceperson who performs maintenance and a replenishment request notification for replenishing consumable items (e.g., a cartridge or a consumable component) to the customer environment. The sales company information management unit 205 manages information about a sales company which provides support the image forming apparatus 102 installed in the customer environment.

The device information management unit 206 manages device information of the image forming apparatus 102 which is a management target thereof. The device information management unit 206 manages identification information of the image forming apparatus 102 (e.g., an Internet protocol (IP) address, a medium access control (MAC) address, and model information), status information and maintenance history of the image forming apparatus 102, manager information of the image forming apparatus 102, and consumable management information of the image forming apparatus 102. The customer information management unit 207 manages information about the customer environment in which the image forming apparatus 102 is installed. The information about the customer environment includes information about a maintenance contract with the sales company and information about a providing apparatus which provides a function for the image forming apparatus 102 installed in the customer environment.

Figure 3:
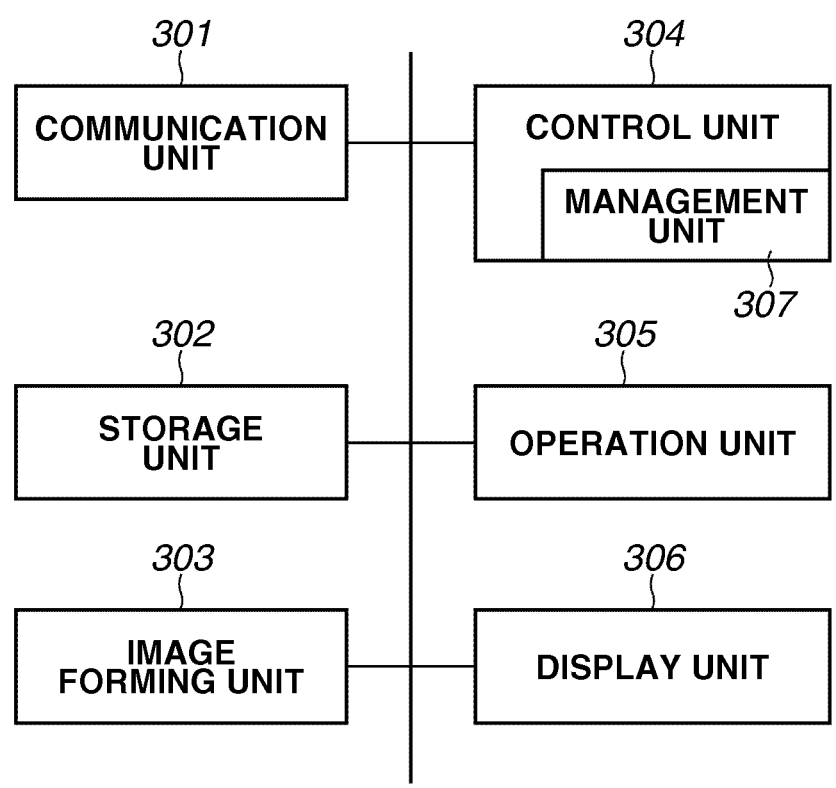
FIG. 3 illustrates an example of a configuration inside an image forming apparatus according to the exemplary embodiment of the present invention.

FIG. 3 illustrates an example of an internal configuration of the image forming apparatus 102. The image forming apparatus 102 includes a communication unit 301, a storage unit 302 including an HDD, a ROM, and a RAM, an image forming unit 303 including an image forming engine, a control unit 304 such as a CPU, an operation unit 305, and a display unit 306.

The communication unit 301 performs communication with the outside by transmitting device information about the image forming apparatus 102 to the management server 106. Further, the communication unit 301 receives instructions transmitted from the management server 106 and communicates with the providing apparatus 108 to request a desired function from the providing apparatus 108 and use it. The communication unit 301 uses a simple mail transfer protocol (SMTP) or HTTP/HTTPS for transmission and reception.

The storage unit 302 stores device information, and information pieces about the management server 106 and the providing apparatus 108. The storage unit 302 also stores the operation history of the image forming apparatus 102 and failure information due to various types of abnormalities or breakdowns occurred in the image forming apparatus 102. The information about the management server 106 includes network information necessary for communication such as the IP address of the management server 106. The information about the providing apparatus 108 includes information about a provided function as well as information about a network. The image forming unit 303 has a function to interpret print data and output a printed product.

The operation unit 305 is an interface by which a user can issue instructions, such as a print instruction, to operate the image forming apparatus 102. The display unit 306 displays appropriate information for the user. Displayed information includes status information and setting information of the image forming apparatus 102.

The control unit 304 controls entire processing, such as communication processing and print processing of the image forming apparatus 102. The control unit 304 receives an input from the operation unit 102 and controls processing such as change of setting in the apparatus. The control unit 304 executes a predetermined program to realize the management of status monitoring and failure information by a management unit 307 which is a logic module, and notification control of the management server 106.

Figure 4:
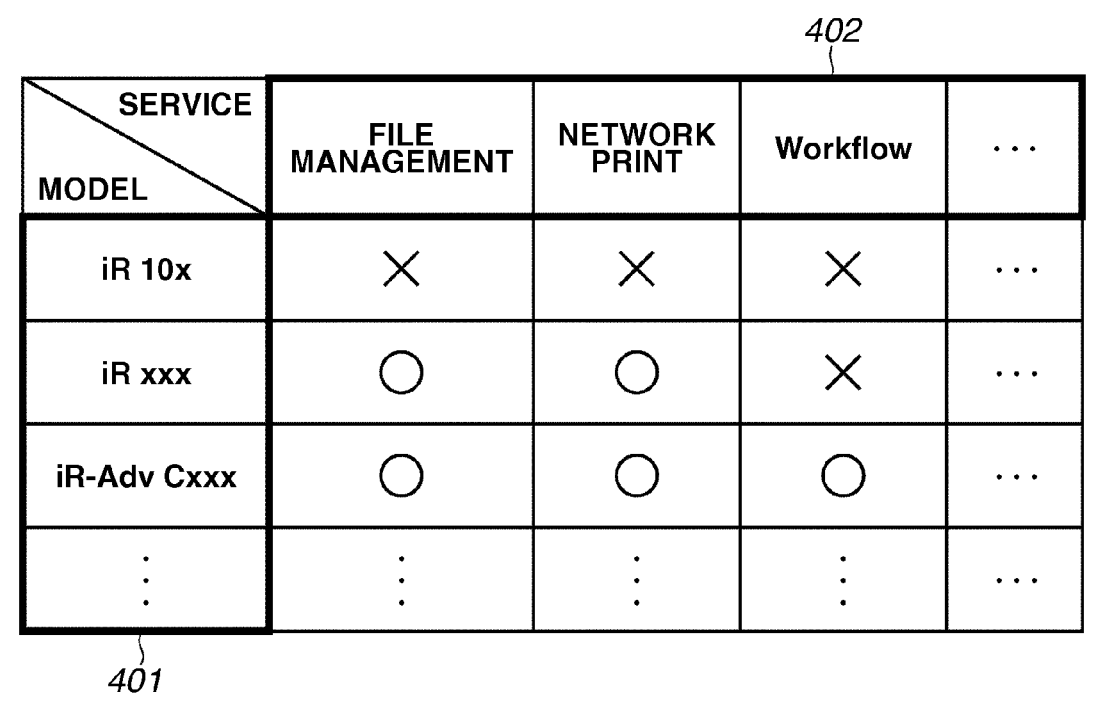

FIG. 4 is an example of a correspondence table between model information of the image forming apparatus 102 which is the management target of the management server 106 and the function provided by the providing apparatus 108. The correspondence table allows the management server 106 to identify the model of the image forming apparatus 102 which can use each function provided by the providing apparatus 108.

The model information is exemplified as identification information 401 of the image forming apparatus 102. The correspondence table includes functions 402 provided by the providing apparatus 108. The function 402 includes a file management function of acquiring and storing a document scanned by the image forming apparatus 102 and a network print function of directly converting a document on the Internet to a desired data format and transmitting the converted document to the image forming apparatus 102 to cause the image forming apparatus 102 to perform printing. There is also exemplified a work flow function of performing desired processing on the data acquired by the image forming apparatus 102 scanning and transmitting to the outside.

The table managed by the management server 106, including a table described below, may be stored in the storage unit 202 of the management server 106 or an external device equipped with a storage unit to which the management server 106 can refer. The format and configuration of the management table are not particularly limited to the above one as long as the similar data management can be performed. For example, the management table of the present exemplary embodiment may be divided to a plurality of tables.

Figure 5:
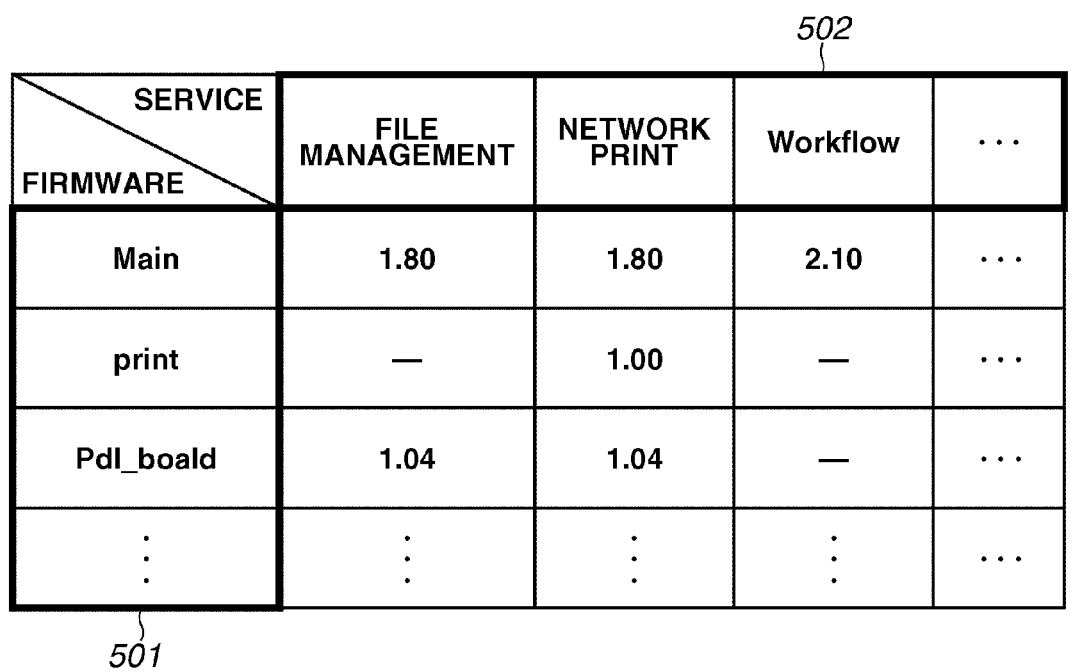
FIG. 5 illustrates a correspondence table between firmware information of the image forming apparatus managed by the management server and the functions provided by the providing apparatus.

FIG. 5 is an example of a correspondence table managed by the management server 106 between the function provided by the providing apparatus 108 and version information of firmware of the image forming apparatus 102 which can use the function.

The table includes firmware information 501 of the image forming apparatus 102 and functions 502 provided by the providing apparatus 108. The correspondence table allows the management server 106 to identify the version of the firmware of the image forming apparatus 102 which is required to use the function provided by the providing apparatus 108.

FIG. 6 is an example of a failure information table managed by the management server 106. A code 601 is used to identify failure occurring in the image forming apparatus 102. The image forming apparatus 102 uses notification including the code to notify the management server 106 of abnormality or breakdown. The table also includes failure contents 602 of each failure. Although not illustrated, importance and others may be added to each failure code. The management server 106 identifies the type of failure with reference to the failure information table and performs notification for dispatching a serviceperson according to the contents or the importance of the failure.

FIG. 7 is an example of a table related to notification destination information managed by the management server 106. The table includes a name of maintenance staff 701 of the sales company for the image forming apparatus 102. The maintenance staff includes a serviceperson who visits a customer to perform maintenance services and an operator who provides services over the telephone. Information about the maintenance staff is managed by associating with information about the sales company and customer managed by the management server 106 based on ID. The maintenance staff provides services for the customer associated therewith. The table also includes information 702 (mail address) about the notification destination of each maintenance staff. By using the table, the management server 106 can notify the maintenance staff who repairs failure occurring in the image forming apparatus 102 of the failure information. The table further includes information 703 about the notification destination of the maintenance staff for the providing apparatus 108.

In the present exemplary embodiment, the management server 106 can remotely manage the image forming apparatus 102 for a maintenance purpose mainly via the network. Further, regarding the providing apparatus 108 providing functions for the image forming apparatus 102, the management server manages necessary information thereof so that the efficient management of the image forming apparatus can be realized.

FIG. 8 is a flow chart illustrating an example of processing related to the notification of the failure information to the management server 106.

In step S801, the management unit 307 detects the occurrence of failure recognized by a sensor (not illustrated) in the image forming apparatus 102. In step S802, the management unit 307 determines whether the image forming apparatus 102 uses the function provided by the providing apparatus 108 when the failure occurs. If the management unit 307 determines that the image forming apparatus 102 uses the function of the providing apparatus 108 (YES in step S802), the processing proceeds to S803. If the management unit 307 determines that the image forming apparatus 102 does not use the function (NO in step S802), the processing proceeds to S806.

In step S803, the management unit 307 determines whether the failure is caused by the providing apparatus 108 from the contents of the failure. For example, if communication is cut off from the providing apparatus 108 side due to the reason that the function used by the image forming apparatus 102 is ended in error, it can be determined that the failure is caused by the providing apparatus 108. Or if a network print function is used and the format or description contents of print data transmitted from the providing apparatus 108 includes abnormality.

More specifically, if the description contents of page description language (PDL) is abnormal. In this case, it is assumed that "PDL cannot be interpreted" at the time of rendering process of the image forming apparatus 102. In such a case, it can be determined that the failure is caused by the providing apparatus 108.

If the management unit 307 determines that the failure is caused by the providing apparatus 108 (YES in step S803), the processing proceeds to step S804. On the other hand, if a failure (paper jam or others) occurring obviously inside the image forming apparatus 102 is detected, or if it is unclear from the failure contents whether the failure is caused by the providing apparatus 108, the management unit 307 determines that the failure is not caused by the providing apparatus 108 (NO in step S803) and the processing proceeds to step S806.

In step S806, the management unit 307 creates failure information related to the occurred failure. The failure information created herein includes a failure code indicating the contents of failure (paper jam and others) occurred in the image forming apparatus itself. Even though the management unit 307 cannot determine that the failure is caused by the providing apparatus 108 (NO in step S803), the management unit 307 creates the failure information including the failure code indicating the failure (communication error or abnormal ending of processing) detected in step S801 and information indicating the failure occurred in using the providing apparatus 108.

In step S804, the management unit 307 creates failure information from which the failure is caused by the providing apparatus 108 can be identified. For example, in the above-described PDL error, the failure information is created including a previously prepared failure code "x20003" indicating a rendering error (the acquired PDL is abnormal). Further, in step S804, the failure information may be created including a failure code which is defined for the failure detected in step S801 for the image forming apparatus and an identifier capable of identifying that the failure is caused by the providing apparatus 108. If the management unit 307 receives information indicating abnormality occurring in the providing apparatus 108 therefrom, the failure information including the received information may be created.

In step S805, the management unit 307 transmits the failure information along with the identification information about the image forming apparatus 102 itself created in step S804 or step S806 to the management server 106. Then, the processing in the flow chart in FIG. 8 is ended.

FIG. 9 is a flow chart illustrating an example of processing in which the management server 106 receives the failure information from the image forming apparatus 102.

In step S901, the notification management unit 204 receives the failure information from the image forming apparatus 102 and performs control for storing the failure information in the storage unit 202. The failure information is received along with the identification information about the image forming apparatus 102 (IP address and model information), stored in the storage unit 202 by being associated therewith, and managed by the device information management unit 206.

In step S902, the notification management unit 204 refers to the failure information table in FIG. 6. The notification management unit 204 determines whether the failure is caused by the image forming apparatus 102 based on the failure code included in the received failure information. If the notification management unit 204 determines that the failure is caused by the image forming apparatus 102 (YES in step S902), the processing proceeds to step S907. If the notification management unit 204 determines that the failure is not caused by the image forming apparatus 102 (NO in step S902), the processing proceeds to step S903.

In step S903, the notification management unit 204 determines whether the received failure information indicates that the failure is caused by the providing apparatus 108 by referring to the failure information table in FIG. 6. If the notification management unit 204 determines that the failure is caused by the providing apparatus 108, in other words, the failure is the one indicated by the failure information created in step S804 (YES in step S903), the processing proceeds to step S906. If not (NO in step S903), the processing proceeds to step S904.

In step S904, the notification management unit 204 analyzes the cause from the device information and information of the providing apparatus 108. More specifically, the notification management unit 204 confirms if the model of the image forming apparatus 102 transmitting the failure information can use the function of the providing apparatus 108 or the version of firmware of the image forming apparatus 102 satisfies the standard for using the function from the correspondence tables illustrated in FIGS. 4 and 5. For example, in a case where the failure information received in step S901 includes information indicating that the failure occurred in using the providing apparatus 108 and the above confirmation proves that the image forming apparatus 102 can use the providing apparatus 108, it is analyzed that the maintenance staff for the providing apparatus 108 should be notified of the failure.

In step S905, the management server 106 determines whether the maintenance staff for the providing apparatus 108 needs to be notified of the failure based on the analysis in step S904. If the management server 106 determines that the maintenance staff for the providing apparatus 108 needs to be notified of the failure (YES in step S905), then in step S906, the management server 106 notifies the maintenance staff for the providing apparatus 108 and the processing is ended. If the management server 106 determines that the failure is not caused by the providing apparatus 108 (NO in step S905), the processing proceeds to step S907.

In step S907, the notification management unit 204 notifies the maintenance staff for the image forming apparatus 102 of the occurrence of the failure. The notification destination can be determined with reference to the table related to the notification destination information in FIG. 7 based on the identification information of the image forming apparatus 102 which transmitted the failure information. The notification of the maintenance staff may include the failure code, so that the occurrence of the failure and the contents thereof can be confirmed therefrom. Based on the notification, the serviceperson can be arranged to restore the failure resulted from the image forming apparatus 102.

The notification destination in notifying the maintenance staff for the providing apparatus 108 of the occurrence of the failure in step S906 is determined with reference to the table related to the notification destination information in FIG. 7 based on the identification information of the image forming apparatus 102 which transmitted the failure information. The notification of the maintenance staff may include the failure code, so that the occurrence of the failure and the contents thereof can be confirmed therefrom. Based on the notification, the maintenance staff for the providing apparatus 108 can be appropriately notified of the failure which can be identified to be caused by at least the providing apparatus 108. Also as for the failure information transmitted from the image forming apparatus 102, the arrangement of the serviceperson in charge of the maintenance of the image forming apparatus 102, which is apparently wasteful, can be suppressed.

In the present exemplary embodiment, if the failure is caused by the providing apparatus 108, the maintenance staff for the image forming apparatus 102 is not particularly notified. However, in step S906, the maintenance staff for the image forming apparatus 102 may be notified that the failure is caused by the providing apparatus 108. Accordingly, the maintenance staff for the image forming apparatus 102 can finely manage all pieces of the failure information received from the image forming apparatus 102 and the causes of the failure.

The first exemplary embodiment describes the processing which is performed when the image forming apparatus 102 notifies the management server 106 of the failure detected therein and the failure notified from the providing apparatus 108. However, in addition to the above case, a serviceperson can be dispatched to the image forming apparatus 102 based on the function provided by the management server 106.

More specifically, the operation unit 305 of the image forming apparatus 102 is provided with an input unit for notifying the management server 106 of a defect found by the user and the failure of an external component which is not directly concerned with image formation (the breakdown of a caster for movement, for example) according to the user's manual input. When the management server 106 receives the notification, the processing for arranging the serviceperson is conducted.

In a second exemplary embodiment, the notification is referred to as a repair request from the image forming apparatus 102. The failure targeted by the repair request is the one which the user recognizes as the failure. A failure code indicating the repair request and additional information which the user inputs via the operation unit 305 at the time of requesting the repair are notified from the image forming apparatus 102 to the management server 106.

In the present exemplary embodiment, the processing similar to that illustrated in FIGS. 8 and 9 is basically performed in the image forming apparatus 102 and the management server 106. More specifically, the detection of occurrence of the failure in step S801 in FIG. 8 is substituted with the detection of the input by the user who requests the repair. In the subsequent steps, the similar processing regarding the repair request is performed. When the additional information indicating that the failure is caused by the providing apparatus 108 is input in step S803, the processing proceeds to step S806. In FIG. 9, a notification destination related to the repair request is switched according to determination whether the function of the providing apparatus 108 is being used and the contents of the additional information.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-134309 filed Jun. 11, 2010, which is hereby incorporated by reference herein in its entirety.

What is claimed is:

1. A management system comprising:
an image forming apparatus and a management server configured to communicate with the image forming apparatus via a network, wherein
the image forming apparatus is capable of communicating with a providing apparatus via a network and is further capable of using a function provided by the providing apparatus, and includes:
a determination unit configured to determine whether a failure detected by the image forming apparatus is caused by the providing apparatus at the time of creating failure information to be transmitted to the management server;
a creation unit configured to create, as failure information, first failure information by which it can be identified that the failure is caused by the providing apparatus if the determination unit determines that the failure is caused by the providing apparatus and create second failure information about the failure detected by the image forming apparatus if the determination unit does not determine that the failure is caused by the providing apparatus; and
a transmission unit configured to transmit the failure information created by the creation unit to the management server, and wherein the management server includes:
a reception unit configured to receive failure information from the image forming apparatus; and
a notification unit configured to perform a first notification for arranging maintenance of the image forming apparatus according to the second failure information received from the image forming apparatus,
wherein, if it can be identified that the failure is caused by the providing apparatus based on the received failure information and the function provided by the providing apparatus can be used by the image forming apparatus, the notification unit of the management server is configured to perform a second notification for arranging maintenance of the providing apparatus.

2. The management system according to claim 1,
further comprising a management unit configured to manage a notification destination of a person in charge of maintenance of the providing apparatus,
wherein, if it can be identified that the failure is caused by the providing apparatus based on the received first failure information, the management server does not arrange the maintenance of the image forming apparatus and the notification unit is configured to notify the notification destination of the person in charge of the maintenance of the providing apparatus managed by the management unit of occurrence of failure as the second notification.

3. The management system according to claim 2, wherein the management server determines whether the function provided by the providing apparatus can be used by the image forming apparatus based on device information including at least either of model information and firmware information about the image forming apparatus, and
the notification unit is configured to, if it can be identified that the failure is caused by the providing apparatus based on the received first failure information and if it is determined that the function provided by the providing apparatus can be used by the image forming apparatus, notify the notification destination of the person in charge of the maintenance of the providing apparatus managed by the management unit of occurrence of failure.

4. The management system according to claim 1, wherein the transmitted failure information includes a repair request manually input by a user via an operation unit of the image forming apparatus.

5. The management system according to claim 1, wherein the creation unit is configured to create the first failure information that includes at least either of a failure code which is previously defined and indicates the failure caused in the providing apparatus and a failure code which is provided by the providing apparatus, as information by which it can be identified that the failure is caused by the providing apparatus.

6. The management system according to claim 1, wherein the management server does not arrange the maintenance of the image forming apparatus if it can be identified that the failure is caused by the providing apparatus based on the received first failure information.

7. A method executed in a management system including an image forming apparatus and a management server configured to communicate with the image forming apparatus via a network, wherein
the image forming apparatus is capable of communicating with a providing apparatus via a network and using a function provided by the providing apparatus, the method comprising:
determining whether a failure detected by the image forming apparatus is caused by the providing apparatus at the time of creating failure information to be transmitted to the management server;
creating, as failure information, first failure information by which it can be identified that the failure is caused by the providing apparatus if it is determined that the failure is caused by the providing apparatus and creating second failure information about the failure detected by the image forming apparatus if it is not determined that the failure is caused by the providing apparatus; and
transmitting the created failure information to the management server;
receiving, by the management server, failure information from the image forming apparatus; and
performing, by the management server, notification for arranging maintenance of the image forming apparatus according to the second failure information received from the image forming apparatus,
wherein, if it can be identified that the failure is caused by the providing apparatus based on the received first failure information and the function provided by the providing apparatus can be used by the image forming apparatus, performing a second notification, by the management server, for arranging maintenance of the providing apparatus.

* * * * *